United States Patent [19]

Nishimura et al.

[11] Patent Number: 4,596,322
[45] Date of Patent: Jun. 24, 1986

[54] TORQUE CONVERTER CLUTCH CONTROL DEVICE FOR VEHICLE

[75] Inventors: Sadanori Nishimura; Yoji Yamada, both of Saitama, Japan

[73] Assignee: Honda Giken Kogyo Kabushiki Kaisha, Tokyo, Japan

[21] Appl. No.: 459,099

[22] Filed: Jan. 19, 1983

[30] Foreign Application Priority Data

Feb. 4, 1982 [JP] Japan .................................. 57-15482
May 17, 1982 [JP] Japan .................................. 57-81493

[51] Int. Cl.$^4$ ........................ B60K 41/22; B60K 41/02
[52] U.S. Cl. .................................. 192/3.31; 192/0.076
[58] Field of Search .............. 192/0.052, 0.075, 0.076, 192/0.092, 3.29, 3.3, 3.31, 103 R; 74/869, 733

[56] References Cited

U.S. PATENT DOCUMENTS

| | | |
|---|---|---|
| 2,694,948 | 11/1954 | McFarland ........................ 192/0.076 |
| 2,793,726 | 5/1957 | Jandasek .............................. 192/3.2 |
| 2,824,631 | 2/1958 | DeLorean .......................... 192/3.31 |
| 2,884,806 | 5/1959 | Tuck . | |
| 2,919,597 | 1/1960 | Borman . | |
| 2,992,713 | 7/1961 | Stump et al. ......................... 192/3.2 |
| 3,078,736 | 2/1963 | Meads et al. . | |
| 3,252,352 | 5/1966 | General et al. . | |
| 4,046,033 | 9/1977 | Hashimoto et al. .................. 74/869 |
| 4,422,353 | 12/1983 | Suga et al. ......................... 192/3.31 |
| 4,449,618 | 5/1984 | Suga et al. ......................... 192/3.31 |
| 4,457,413 | 7/1984 | Hattori ............................. 192/0.076 |
| 4,510,747 | 4/1985 | Yoshida ............................. 192/3.31 |

Primary Examiner—George H. Krizmanich
Attorney, Agent, or Firm—Lyon & Lyon

[57] ABSTRACT

A wheeled vehicle has an internal combustion engine provided with an air intake having a throttle valve. A change speed transmission drives certain of the wheels and receives power from a fluid torque converter having an impeller driven by the engine and a turbine connected to drive the change speed transmission. A clutch establishes a direct drive between the impeller and the turbine, and the clutch is closed when the vehicle speed exceeds a predetermined level but is prevented from closing when the opening in the engine throttle valve is smaller than a predetermined magnitude.

7 Claims, 3 Drawing Figures

TORQUE CONVERTER CLUTCH CONTROL DEVICE FOR VEHICLE

This invention relates to a device for controlling the operation of a clutch for a torque converter used in a transmission for vehicles.

Conventional devices of this kind employ a fluid torque converter for coupling a vehicle transmission to an engine, the fluid torque converter having a clutch operable to mechanically couple the impeller to the turbine of the converter. A first control valve is responsive to vehicle speed signal pressure so that the clutch closes when the vehicle speed exceeds a predetermined magnitude. A second control valve is provided for control of the vehicle speed signal pressure and it is operable in response to a transmission system signal pressure. The latter signal pressure is generated at the time of selection of a predetermined transmission gear for permitting the input of the vehicle speed signal pressure to said first control valve. The clutch is closed when the vehicle speed exceeds a predetermined speed at the time of selection of the aforementioned predetermined transmission gear. A slip in the fluid torque converter is prevented by means of mechanical torque transmission through the clutch, thus permitting efficient torque transfer at the time of high speed cruising and causing a reduction in the rate of the fuel consumption. However, in this conventional system, as disclosed in U.S. Pat. No. 3,252,352, when the accelerator pedal is returned for reducing the running speed at the time of the clutch operation, in the initial stage of the reduced speed running the engine is driven from the vehicle wheels through the clutch. This causes the vehicle to rock backwards and forwards. In such a case, the person in the vehicle feels discomfort.

The object of this invention is to provide a device which can overcome the above drawback. According to the invention, there is provided a transmission for a vehicle, including a fluid torque converter for coupling a change speed gear transmission to an engine, the fluid torque converter having a clutch operable to mechanically couple the impeller to the turbine of the converter. A first control valve is responsive to vehicle speed signal pressure so that the clutch closes when the vehicle speed exceeds a predetermined magnitude. A second control valve is provided for control of the vehicle speed signal pressure and it is operable in response to a transmission system signal pressure. The latter signal pressure is generated at the time of selection of a predetermined transmission gear for permitting the input of the vehicle speed signal pressure to said first control valve. The clutch is closed when the vehicle speed exceeds a predetermined speed at the time of selection of the aforementioned predetermined transmission gear. The transmission is characterized by a transmission system signal inhibiting device, which is adapted to inhibit the input of the transmission system signal pressure to the second control valve when the throttle opening of the engine is below a predetermined opening.

Other objects and advantages will appear hereinafter.

Figure 1:
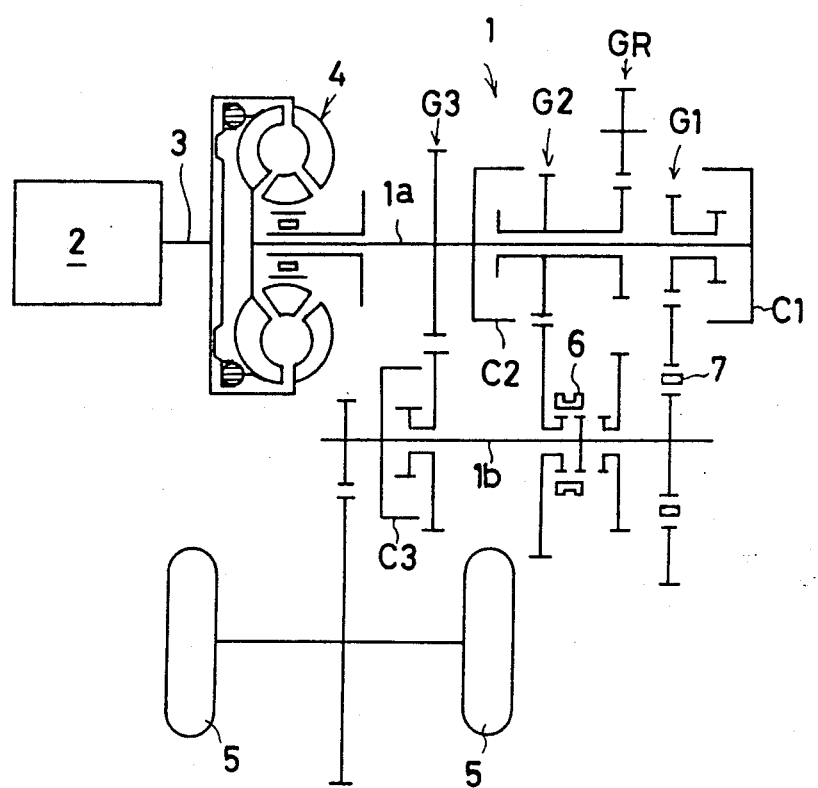
FIG. 1 is a schematic diagram showing an hydraulic coupling and a change speed transmission for a vehicle.

Referring to the drawings, the vehicle transmission generally designated 1 includes an input shaft 1a coupled to a crankshaft 3 of the engine 2 via a fluid torque converter 4, and an output shaft 1b coupled to driving wheels 5 of the vehicle. Between these shafts 1a and 1b, 1st, 2nd and 3rd speed forward gears G1, G2 and G3 and a reverse gear GR are interposed. 1st, 2nd and 3rd speed hydraulic clutches C1, C2 and C3 are disposed for coupling to the respective gears G1, G2 and G3. The power drives through gears G1, G2 and G3 are selectively established with the closure of the respective hydraulic clutches C1, C2 and C3. The 2nd speed hydraulic clutch C2 is commonly used for both the 2nd speed gear G2 and the reverse gear GR. The reverse drive through gear GR is established by the action of shifting a selector gear 6, which selects the gear G2 or GR. In FIG. 1, reference numeral 7 designates a one-way clutch disposed for driving engagement with the 1st speed gear G1, and which acts to permit overspeed rotation of the output shaft 1b.

Figure 2:
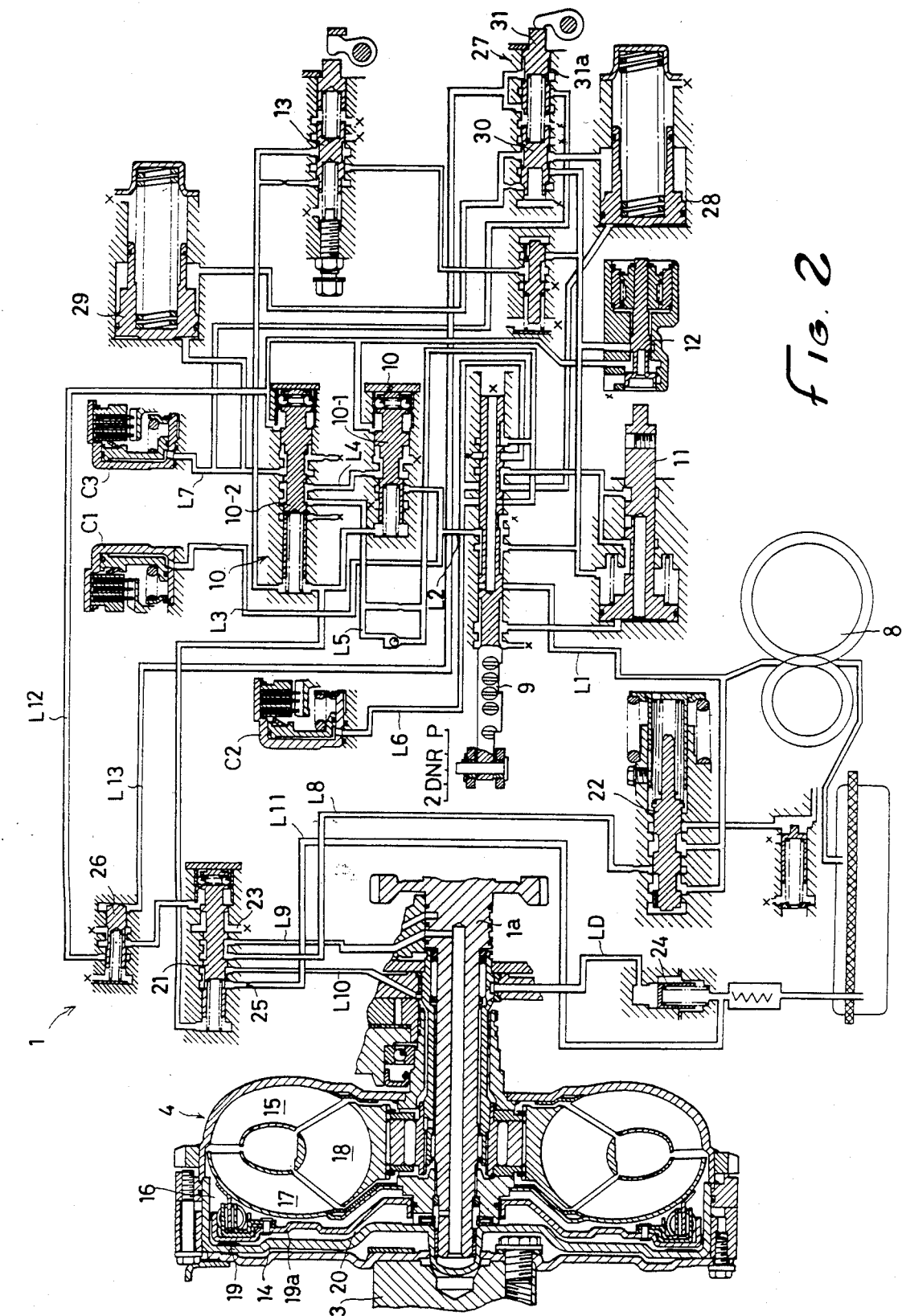
FIG. 2 is a circuit diagram showing a preferred embodiment of the invention.

The hydraulic clutches C1, C2 and C3 are controlled by supply and discharge of fluid, for instance, by means of an hydraulic circuit shown in FIG. 2. This hydraulic circuit includes an hydraulic pressure source 8, and a manual valve 9 which can be shifted to one of five positions, i.e., parking position P, a reverse position R, a neutral position N, a forward position D and a 2nd speed keeping position 2. A shift valve 10 is operable in response to the vehicle speed and the throttle opening of the engine, and a servo valve 11 for shifting between forward and reverse couples the selector gear 6. When the manual valve 9 is shifted to the position D, the first fluid line L1 for supplying fluid leading to the hydraulic pressure source 8 is connected to a second fluid line L2 leading to the shift valve 10, whereby fluid is supplied to the 1st speed hydraulic clutch C1 through a third fluid line L3. This fluid line L3 branches from the second fluid line L2 and also to the 2nd and 3rd speed hydraulic clutches C2 and C3 through the shift valve 10. The shift valve 10 includes an upstream side first valve 10-1 for shifting between 1st and 2nd speeds and a downstream side second valve 10-2 for shifting between 2nd and 3rd speeds, these valves being connected to each other via a fourth fluid line L4. The individual valves 10-1 and 10-2 are acted on at one end, i.e., the right hand end, by governor pressure from a governor valve 12 corresponding to the vehicle speed, and at the left hand end by a throttle pressure from a first throttle valve 13 corresponding to the throttle opening of the engine. When the vehicle speed is increased, the first valve 10-1 is shifted from the right hand 1st speed position to the left hand 2nd speed position, whereby the second fluid line L2 is connected to a fifth fluid line L5 on the outlet side of the second valve 10-2 through the fourth fluid line L4. When the manual valve 9 is in the position D, fluid is supplied to the 2nd speed hydraulic clutch C2 through a sixth fluid line L6 connected to the fifth fluid line L5. When the vehicle speed is further increased, the second shift valve 10-2 is shifted from the right hand 2nd speed position to the left hand 3rd speed position, whereby the fourth fluid line L4 is disconnected from the fifth fluid line L5 and connected to a seventh fluid line L7 leading to the 3rd speed hydraulic clutch C3 to supply fluid to the 3rd speed hydraulic clutch C3.

In the torque converter 4, a pump vane or impeller wheel 15 is connected to the crankshaft 3 of the engine 2. A turbine vane wheel 17 is connected to the drive shaft 1a of the transmission 1. A stator vane wheel 18 is located between the vane wheels 15 and 17. Both wheels 17 and 18 are mounted in a space 16 defined within the case 14 and the vane wheel 15. The torque converter 4 also includes a clutch 19, for mechanically coupling and decoupling the input case 14 on the input side of the torque converter 4 and the output side turbine vane wheel 17. When the clutch 19 is decoupled, torque is fluidly transmitted by circulation of fluid through the vane wheels 15, 17 and 18. When the clutch 19 is closed, torque is mechanically transmitted through the clutch 19. The clutch 19 may be a multi-plate friction clutch or uni-directional clutch, or various other types of clutches may be used. The illustrated clutch is a one-plate friction clutch having a clutch plate 19a disposed for axial movement in a space between the input case 14 and the turbine vane wheel 17. The clutch can be shifted between a decoupled state, which is brought about with the supply of fluid into a fluid chamber 20 between the clutch plate 19a and the input case 14 and in which the clutch plate 19a is moved away from the input case 14, and a closed or coupled state, which is brought about with the discharge of fluid from the fluid chamber 20 and in which the clutch plate 19a is urged by the pressure in the space 16 to be in frictional engagement with the input case 14. The shifting between the supply of fluid and the discharge of fluid with respect to the fluid chamber 20 is controlled by a control valve 21, which in turn is controlled by a vehicle speed signal, for instance, the governor pressure from the governor valve 12. The control valve 21 can be shifted from a right hand position (illustrated position), in which the clutch is decoupled to connect an eighth fluid line L8 which leads the pressurized fluid from the hydraulic pressure source 8 through a regulator 22 to a ninth fluid line L9 leading to the fluid chamber 20 for supplying fluid to the fluid chamber 20. Shifting of the control valve to a left hand position causes the clutch to connect the ninth fluid line L9 to a port 23 open to atmosphere for discharging fluid from the fluid chamber 20. The control valve 21 is urged to the clutch coupling position by the governor pressure, and with an increase in the vehicle speed beyond a predetermined speed the control valve 21 is switched to the clutch coupling position to couple the clutch 19.

In the coupling position mentioned above, pressurized fluid is supplied to a tenth fluid line L10, which leads to the space 16, through the eighth fluid line L8. The pressure in the space 16 that is developed at this time is set to a comparatively high pressure by the action of a check valve 24 arranged across a fluid discharge line LD of the space 16. In the decoupling position, fluid is supplied to the space 16 through the fluid chamber 20, and fluid is discharged through the tenth fluid line L10 and an eleventh fluid line L11 having an orifice 25 therein. The pressure in the space 16 at this time is set to a comparatively low pressure.

Further, the throttle pressure from the first throttle valve 13 acts on the control valve 21 to oppose the governor pressure so that shifting to the clutch coupling position can be effected at a higher speed when the throttle opening is increased. Further, in order for the shifting of the control valve 21 to the clutch coupling position to be effected only at the time of the establishment of the 3rd speed drive through gear G3, a second control valve 26 for control of the vehicle speed signal pressure is provided in a twelfth fluid line L12 which leads the governor pressure to the control valve 21. The second control valve 26 is opened by a transmission system signal pressure generated at the time of selection of the 3rd speed drive through gear G3, for instance, 3rd speed pressure generated in the seventh fluid line L7 leading to the 3rd speed hydraulic clutch C3 and supplied to the valve 26 through a thirteenth fluid line L13 branching from the seventh fluid line L7.

In accordance with this invention, there is provided a transmission system signal inhibitor 27 which is operated when the throttle opening of the engine 2 is less than a predetermined value. The inhibitor 27 acts to inhibit the input of the 3rd speed pressure to the second control valve 26.

In the embodiment shown in FIG. 2, the inhibitor 27 comprises a cut-off valve, the valve body of which is formed by an accelerator-interlocked plunger 31 of a second throttle valve 30, which acts in response to the engine throttle opening to control the back pressure of pressure buffering accumulators 28 and 29 for the 2nd and 3rd hydraulic clutches C2 and C3. The cut-off valve 27 is arranged in the thirteenth fluid line L13. The upstream side and downstream side of the thirteenth fluid line L13 communicate with each other via a peripheral groove 31a formed in the plunger 31, so that the plunger 31 can be moved to the right as viewed in FIG. 2 with a reduction in the engine throttle opening to interrupt the communication between the upstream side and the downstream side of the fluid line L13. This acts to inhibit the supply of the 3rd speed pressure to the second control valve 26 when the engine throttle opening becomes less than a predetermined opening.

Figure 3:
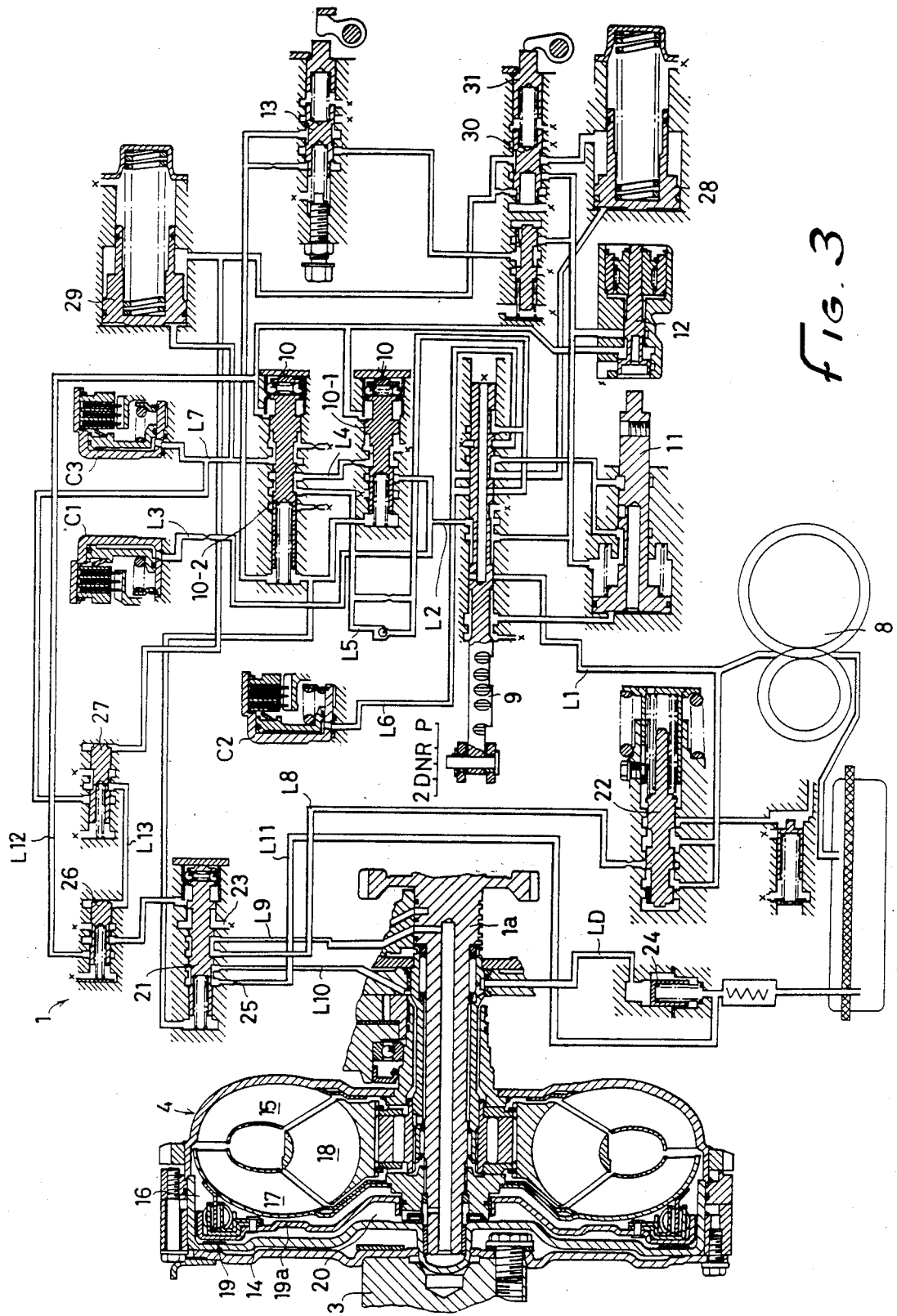
FIG. 3 is a circuit diagram showing a modification.

However, this arrangement is by no means limitative. FIG. 3 shows an alternative arrangement. Here, a cut-off valve 27, on which the throttle pressure from the second throttle valve 30 acts to open it, is provided in the thirteenth fluid line L13 to construct the interrupter 27. In operation, at the time of establishment of the 1st speed drive through gear G1 with the supply of fluid to the 1st hydraulic clutch C1, or at the time of establishment of the 2nd speed drive through gear G2 with the supply of fluid to the 2nd hydraulic clutch C2, the second control valve 26 is closed to cut supply of the governor pressure to the first control valve 21. As a consequence, the first control valve 21 is always kept in the clutch decoupling position so that the clutch 19 is held in the decoupled state. Thus, smooth acceleration making use of the torque amplification due to the fluid torque transmission can be obtained. When the 3rd speed drive through gear G3 is established with the supply of fluid to the 3rd hydraulic clutch C3 caused by an increase in the vehicle speed, the 3rd speed pressure is supplied to the second control valve 26 to open the valve 26 when the throttle opening is above a predetermined opening. Through this valve 26, the governor pressure is supplied to the first control valve 21, shifting the valve 21 to the clutch coupling position when the vehicle speed exceeds a predetermined speed, to bring the clutch 19 into closed position. If the vehicle is decelerated by return of the accelerator pedal in this state, the cut-off valve 27 as the transmission system signal inhibitor is closed with a reduction in the engine throttle opening below a predetermined opening. As a result, the input of the 3rd speed pressure to the second control valve 26 is interrupted to close the valve 26, thus interrupting the input of the governor pressure to the first control valve 21. Consequently, the valve 21 is returned to the clutch decoupling position to open the clutch 19, so that the back driving force from the driving wheels 5 is absorbed with a slip in the fluid torque converter and thus prevented from being transmitted to the engine 2.

The same operation as described above can be obtained by arranging a cut-off valve, which is closed when the engine throttle opening becomes smaller than a predetermined throttle opening, in series with the second control valve 26 in the twelfth fluid line L12 leading governor pressure to the first control valve 21. However, according to this modification, a difference is produced between the pressure supplied to the first control valve 21 and normal governor pressure resulting from a reduction in the governor pressure caused by leakage of pressure from the two valves. Therefore, there is a possibility of reducing the accuracy of the operation of the first control valve 21. On the other hand, according to the invention, the second control valve 26 alone is provided in the twelfth fluid line L12, and therefore the pressure reduction due to leakage of the governor pressure can be kept low so that reasonably accurate operation of the first control valve 21 can be obtained.

While in the above embodiment the transmission 1 is of the fully automatic type, the invention may also be applied to a system using a semi-automatic transmission.

As has been described in the foregoing, the clutch operation control device according to the invention comprises a transmission system signal inhibitor, which inhibits the input of the transmission system signal pressure to the second control valve for controlling the input of the vehicle speed signal pressure to the clutch-controlling first control valve when the throttle opening of the engine becomes less than a predetermined value. Therefore, when the engine throttle opening becomes less than the predetermined value, the clutch is automatically opened, so that the transmission of the back driving force to the engine through the clutch is prevented at the time of engine deceleration. The vehicle speed signal pressure is supplied not through a plurality of valves but through a single second control valve to the first control valve. Thus, the pressure reduction due to leakage can be suppressed, and accurate clutch operation control in response to the vehicle speed by the first control valve is feasible.

Having fully described our invention, it is to be understood that we are not to be limited to the details herein set forth but that our invention is of the full scope of the appended claims.

We claim:

1. For use in a wheeled vehicle having an internal combustion engine provided with an air intake having a throttle valve, the improvement comprising, in combination: a fluid torque converter having a first rotary part driven by the engine and a second rotary part fluid-driven from said first rotary part, a change speed transmission driven by said second rotary part and connected to drive at least one wheel of the vehicle, a releasable clutch for connecting said rotary parts in a direct driving relationship, means including an hydraulic circuit for closing the clutch when the vehicle speed exceeds a predetermined level, and an inhibitor in said hydraulic circuit acting to override said hydraulic circuit and thereby prevent closing of the clutch when the opening through said engine throttle valve is below a predetermined minimum.

2. For use in a wheeled vehicle having an internal combustion engine provided with an air intake having a throttle valve, the improvement comprising, in combination: a fluid torque converter having a vaned impeller driven by the engine and a vaned turbine fluid-driven from the impeller, a change speed transmission driven by the turbine and connected to drive certain wheels of the vehicle, a releasable clutch for connecting said turbine and said impeller in a direct driving relationship, means including an hydraulic circuit having a clutch operator for closing the clutch when the vehicle speed exceeds a predetermined level, and an inhibitor in said hydraulic circuit acting to override and disable said clutch operator when the opening through said engine throttle valve is below a predetermined minimum.

3. For use in a wheeled vehicle having an internal combustion engine provided with an air intake having a throttle valve, the improvement comprising, in combination: a change speed transmission, a fluid torque converter having a first part driven by the engine and a second part connected to drive certain of the wheels through said change speed transmission, a releasable clutch for connecting said first and second parts of said torque converter in direct driving relationship, means including an hydraulic circuit for directing flow of power through said transmission at a plurality of speed ratios, said means including a manually operable transmission ratio selector, and also including an operator responsive to vehicle speed as modified by the selector, said operator acting to close said clutch when the vehicle speed exceeds a predetermined level, and an inhibitor in said hydraulic circuit acting to override and prevent the closing of the clutch when the opening through said engine throttle valve is below a predetermined minimum.

4. A control for a torque converter lock-up clutch for a transmission of a vehicle having an internal combustion engine with an air intake having a throttle valve, comprising, means including hydraulic circuit means for operating the lock-up clutch to an engaged condition above a predetermined vehicle speed and means responsive to postions of said throttle valve for causing disengagement of the lock-up clutch for throttle valve openings below a predetermined minimum regardless of vehicle speed.

5. The control of claim 4 wherein said means for causing disengagement of the lock-up clutch include a valve means for inhibiting hydraulic fluid flow in said hydraulic circuit means that causes said engagement condition aobve predetermined vehicle speed.

6. The control of claim 5 wherein said valve means is directly responsive to the throttle valve position.

7. The control of claim 4 wherein said predetermined minimum throttle valve opening represents a low load condition of the engine to disengaging the lock-up clutch for releasing the engine from direct locked connection to the transmission.

* * * * *